(12) United States Patent
Okada et al.

(10) Patent No.: US 6,283,614 B1
(45) Date of Patent: Sep. 4, 2001

(54) LIQUID CRYSTAL PROJECTION APPARATUS AND LAMP

(75) Inventors: Takehiro Okada, Ibaraki; Makoto Hoshino, Takatsuki, both of (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/482,522

(22) Filed: Jan. 14, 2000

(30) Foreign Application Priority Data

Jan. 18, 1999 (JP) .................................................. 11-008775

(51) Int. Cl.[7] ...................................................... F21V 29/00
(52) U.S. Cl. ......................... 362/294; 362/345; 362/318; 362/373; 362/264; 362/227
(58) Field of Search .................................... 362/294, 318, 362/373, 227, 264, 345

(56) References Cited

U.S. PATENT DOCUMENTS 5,676,442 * 10/1997 Fujimori .............................. 353/119
5,743,610 * 4/1998 Yajima et al. ........................ 353/31

FOREIGN PATENT DOCUMENTS

| 5-276523 | 10/1993 | (JP) . |
| 6-194621 | 7/1994 | (JP) . |
| 10-27518 | 1/1998 | (JP) . |

* cited by examiner

*Primary Examiner*—Alan Cariaso
*Assistant Examiner*—Ali Alavi
(74) *Attorney, Agent, or Firm*—Wenderoth, Lind & Ponack, L.L.P.

(57) ABSTRACT

In a liquid crystal projection apparatus having a plurality of lamps, and a plurality of cooling means for cooling the plurality of lamps individually, the lamp includes the following: a cup-shaped reflecting mirror 41 having an air discharge hole 41A, an insulator 50 having an air suction hole 50A, a front glass 42, a light emitting tube 40, and air passages (a) to (c) in the lamp for cooling the light emitting tube. The cooling means 12 sucks in hot air from the lamp, and exhausts the hot air toward the louver of the case. Thus, the lamps and the liquid crystal projection apparatus are cooled effectively.

8 Claims, 8 Drawing Sheets

LIQUID CRYSTAL PROJECTION APPARATUS AND LAMP

FIELD OF THE INVENTION

The present invention relates to a liquid crystal projection apparatus for magnifying and projecting images of liquid crystal panel and the like, and more particularly to cooling of the lamp used as the light source of the liquid crystal projection apparatus.

BACKGROUND OF THE INVENTION

An apparatus for magnifying and projecting images of a liquid crystal panel by using a light source such as metal halide lamp has been hitherto known. In such liquid crystal projection apparatuses, the light generated from the lamp light source is focused on the liquid crystal panel through an optical system of mirrors and others, and displayed on the screen through a projection lens. Recently, a liquid crystal projection apparatus of a high luminance type is available so that images projected on a wide screen can be seen even in a bright room. The liquid crystal projection apparatus of high luminance type comprises an optical system having a high output lamp, small-sized light emitting device, and an improved light utilization rate. FIG. 5 shows an example of an optical system of such liquid crystal projection apparatus. In order to further enhance the brightness of the image, a liquid crystal projection apparatus having two or more lamps as the light source is also developed. The liquid crystal projection apparatus of the invention has two or more lamps as the light source. FIGS. 6(a) and (b) show the two-lamp optical system of the liquid crystal projection apparatus disclosed in Japanese Laid-open Patent No. 5-29320. FIG. 7 shows the two-lamp optical system of the liquid crystal projection apparatus disclosed in Japanese Laid-open Patent No. 5-49569. As shown in FIG. 7, a light emitting tube 20 is fixed near the focus of a reflecting mirror 21 of an elliptical or parabolic surface, and the light from the light emitting tube passes through the focusing system parts consisting of first lens array 24, second lens array 25, and field lens 23, and illuminates a liquid crystal panel 26. The first lens array 24 and second lens array 25 have an integrator function for illuminating the screen uniformly. The image from the liquid crystal panel 26 is synthesized into a color image by a cross prism, and is magnified and projected on the screen by a projection lens 27. The two-lamp optical system is capable of obtaining a bright image, but it has its own problem in cooling of two lamps. FIG. 7 shows an example of cooling of two lamps. An axial flow fan 30 cools the lamps from behind in order to keep the temperature below about 950° C. in the upper part of the light emitting tube 20, and below 350° C. in the seal part. However, the case of two-lamp system, for example, in the case of lamps in a structure enclosed by the reflecting mirrors and front glass as in the super-high pressure mercury lamps, if there is an air vent near the front glass of the lamp, it is difficult to limit temperature rise of lamps by cooling from behind by the axial flow fan 30. It is also difficult to cool the two lamps in the same state. Cooling of two lamps and cooling of the entire apparatus are more difficult as the size of the apparatus is more compact. To solve these problems, it is hence an object of the invention to present a liquid crystal projection apparatus having two or more lamps capable of keeping the temperature in the apparatus within a specified temperature and cooling two or more lamps in a same state. It is also an object of the invention to present a lamp capable of keeping the temperature of the light emitting tube and other parts in the lamp within a specified temperature, by forming an air passage in the lamp.

SUMMARY OF THE INVENTION

To achieve the objects, the liquid crystal projection apparatus of the invention has a plurality of lamps, and each lamp of the plurality of lamps is furnished with cooling means for cooling the lamp. In other words, the liquid crystal projection apparatus of the invention has the same number of cooling means as the plurality of lamps in order to cool the plurality of lamps individually. As a result, the plurality of lamps are cooled in a same state. The cooling means includes an air suction port and an air discharge port. A centrifugal fan having air suction port and air discharge port can be used as cooling means. The furnished cooling means is disposed in the upper part or lower part of the lamp. That is, all furnished cooling means are disposed parallel in the upper part of the plurality of lamps, or all furnished cooling means are disposed parallel in the lower part of the plurality of lamps. The lamp has an air suction hole and an air discharge hole. The cooling means sucks in hot air from the air discharge hole of the lamp, and exhausts this hot air outside of the apparatus through a louver of the case of the liquid crystal projection apparatus. Since the louver is disposed near the air discharge port of the cooling means, the hot air from the lamp is exhausted outside of the apparatus without heating the inside of the apparatus. Thus, an air stream flowing in the lamp from the air suction hole of the lamp into the air discharge hole is formed, and this air stream effectively cools the light emitting tube and other parts in the lamp.

The louver is opened obliquely to the front direction, in which the image projecting direction is defined to be the front direction. Therefore, the user of the liquid crystal projection apparatus is usually situated beside or behind the apparatus, and is hence free from effects of hot air, noise or leak light from the apparatus.

DETAILED DESCRIPTION OF THE INVENTION

EMBODIMENT

Figure 1:
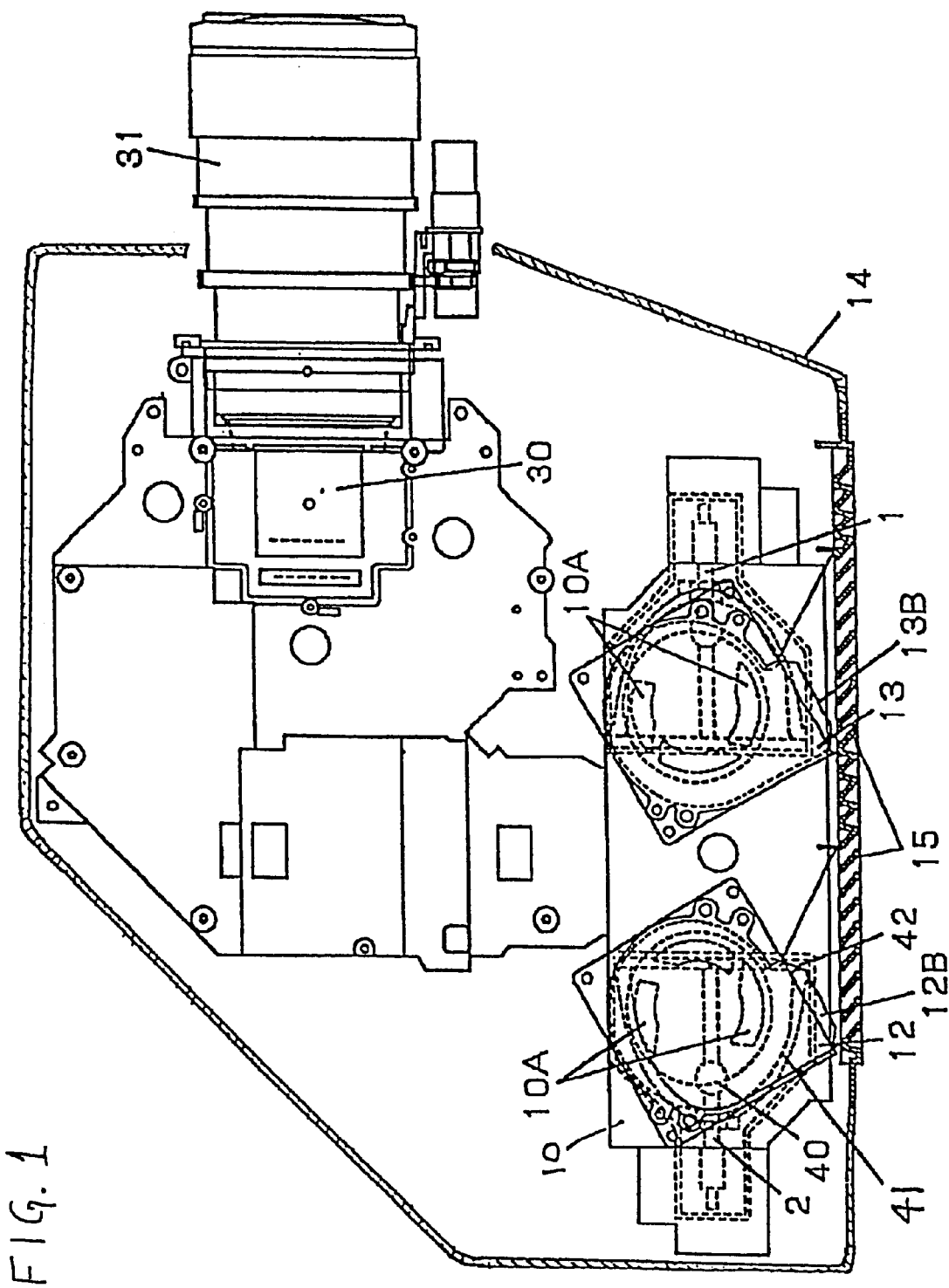
FIG. 1 is a plan of a liquid crystal projection apparatus in an embodiment of the invention.
Figure 2:
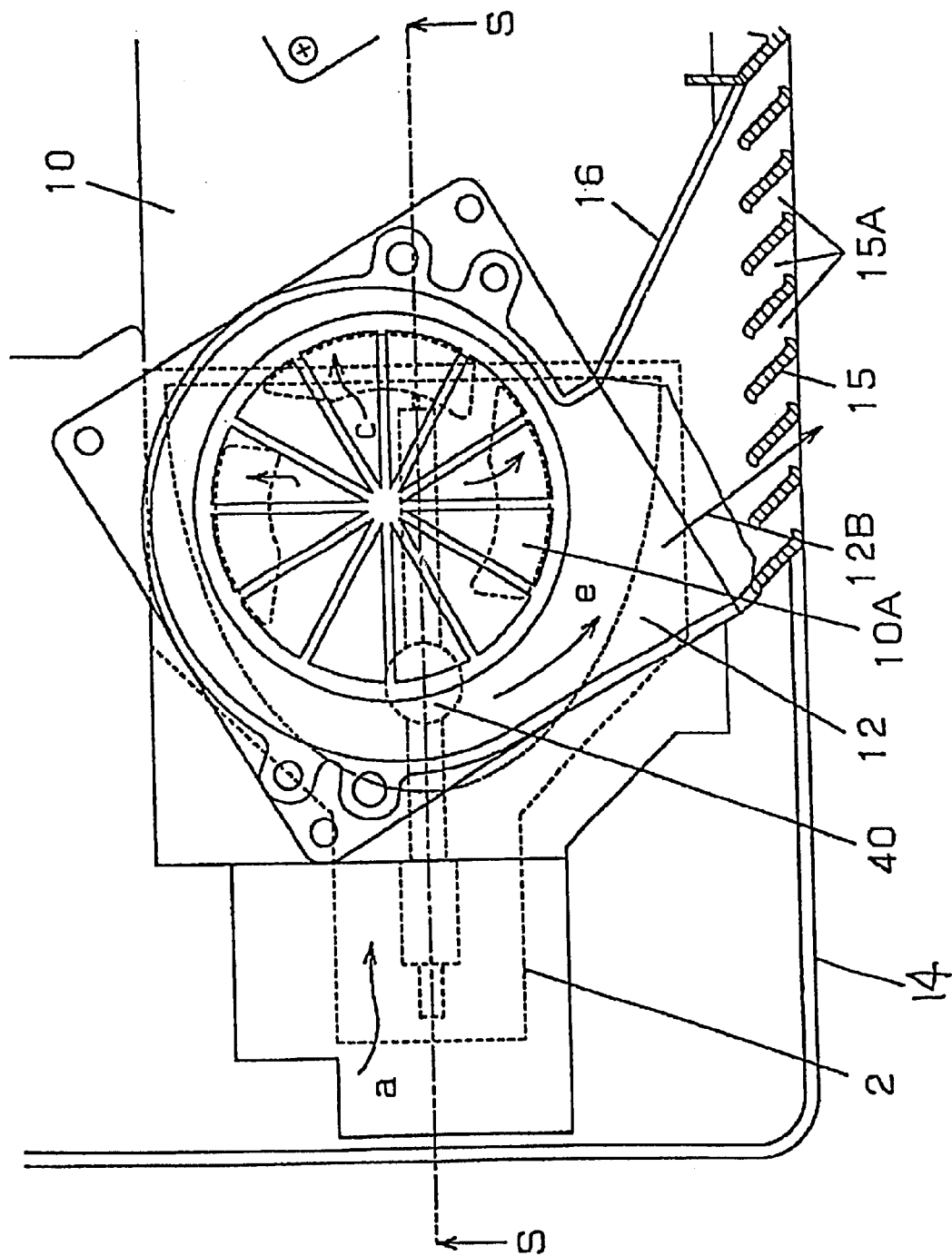
FIG. 2 is a partially magnified view of FIG. 1.
Figure 3:
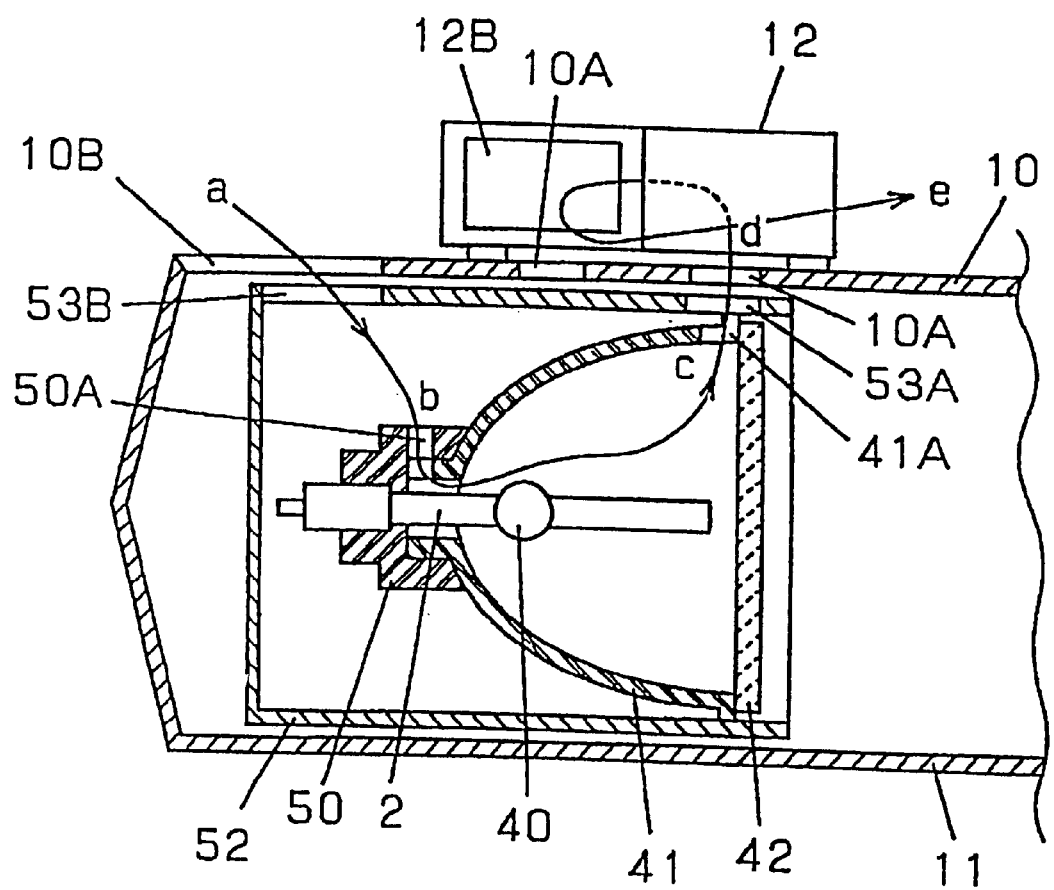
FIG. 3 is a sectional view of a lamp of the invention as seen from the cut-off line S—S direction in FIG. 2.
Figure 4:
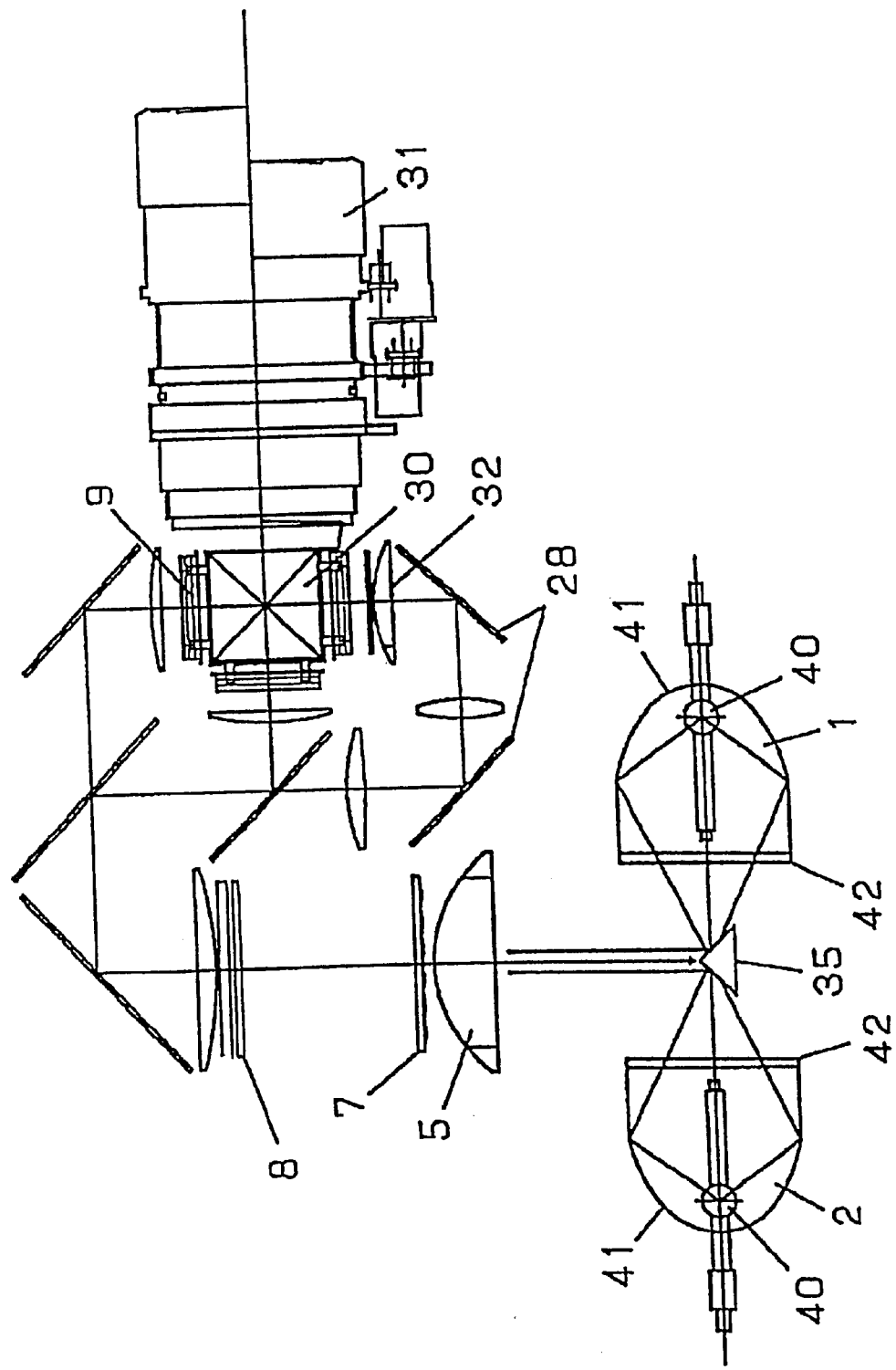
FIG. 4 shows a two-lamp optical system of the liquid crystal projection apparatus of the invention.
Figure 5:
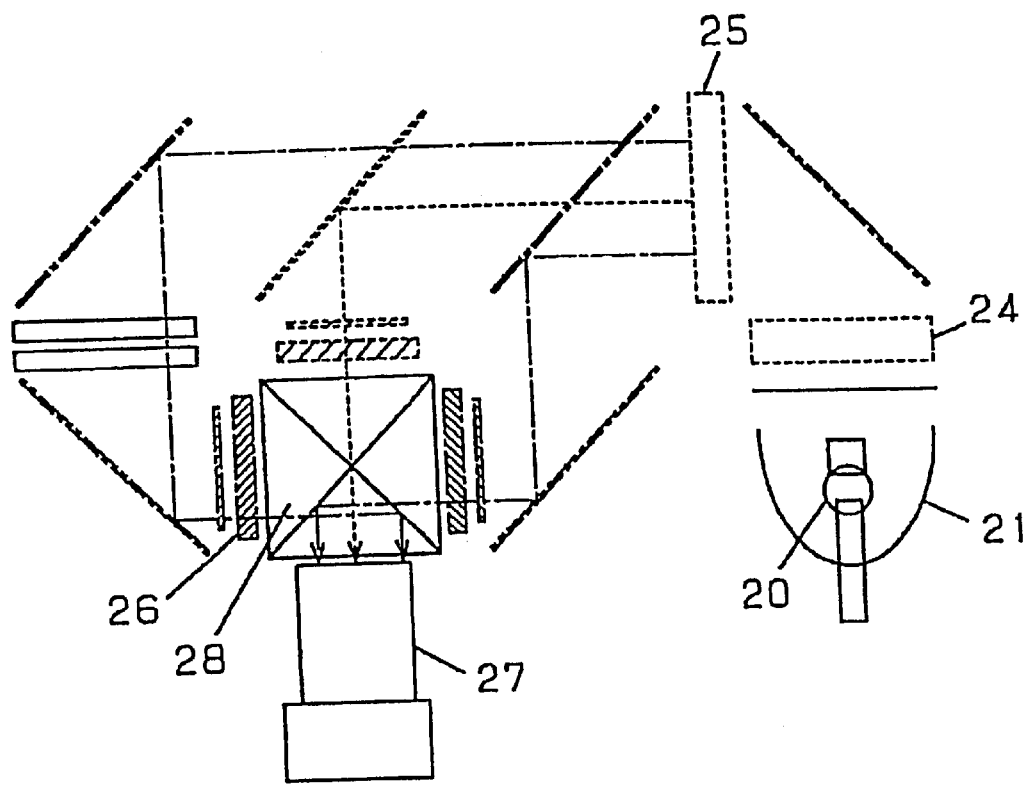
FIG. 5 shows a one-lamp optical system of the liquid crystal projection apparatus of a prior art.
Figure 6B:
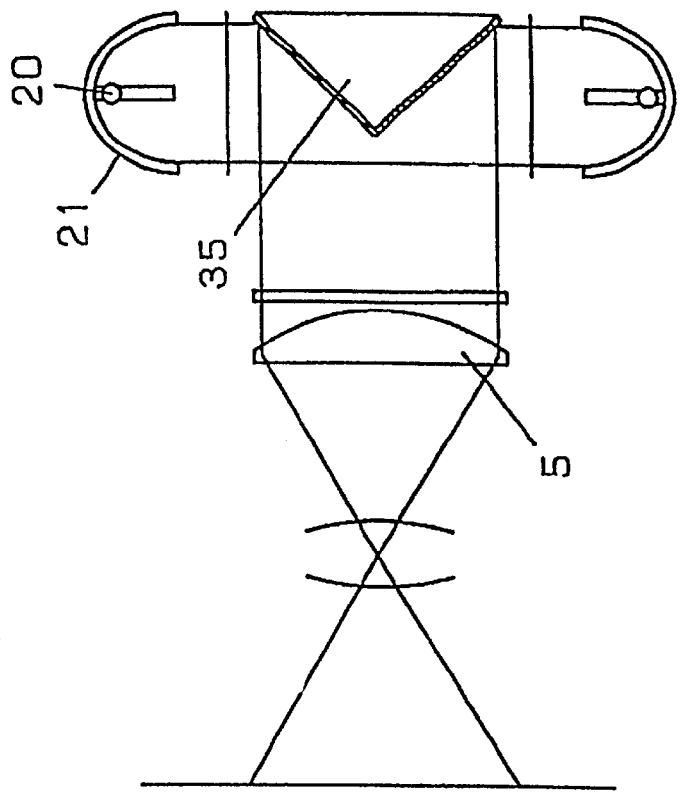
FIG. 6 shows a two-lamp optical system of the liquid crystal projection apparatus of a prior art.
Figure 6A:
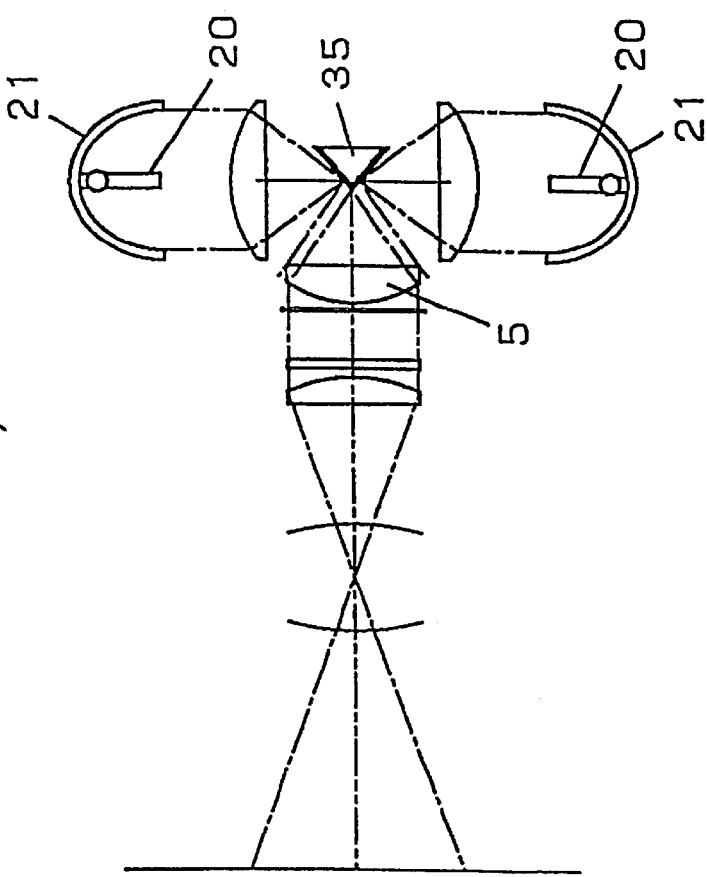
Figure 7:
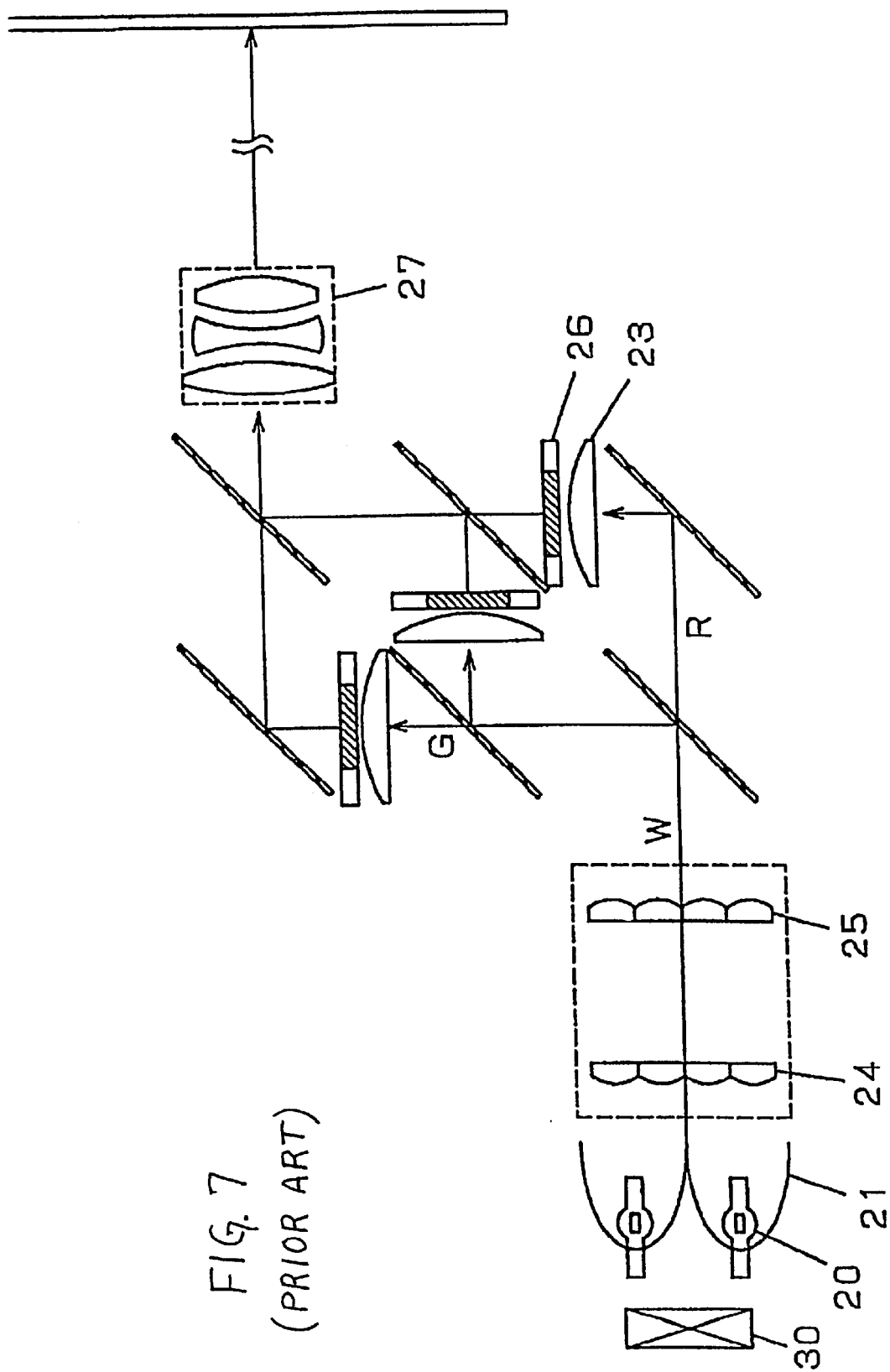
FIG. 7 shows other example of a two-lamp optical system of the liquid crystal projection apparatus of a prior art.
Figure 8:
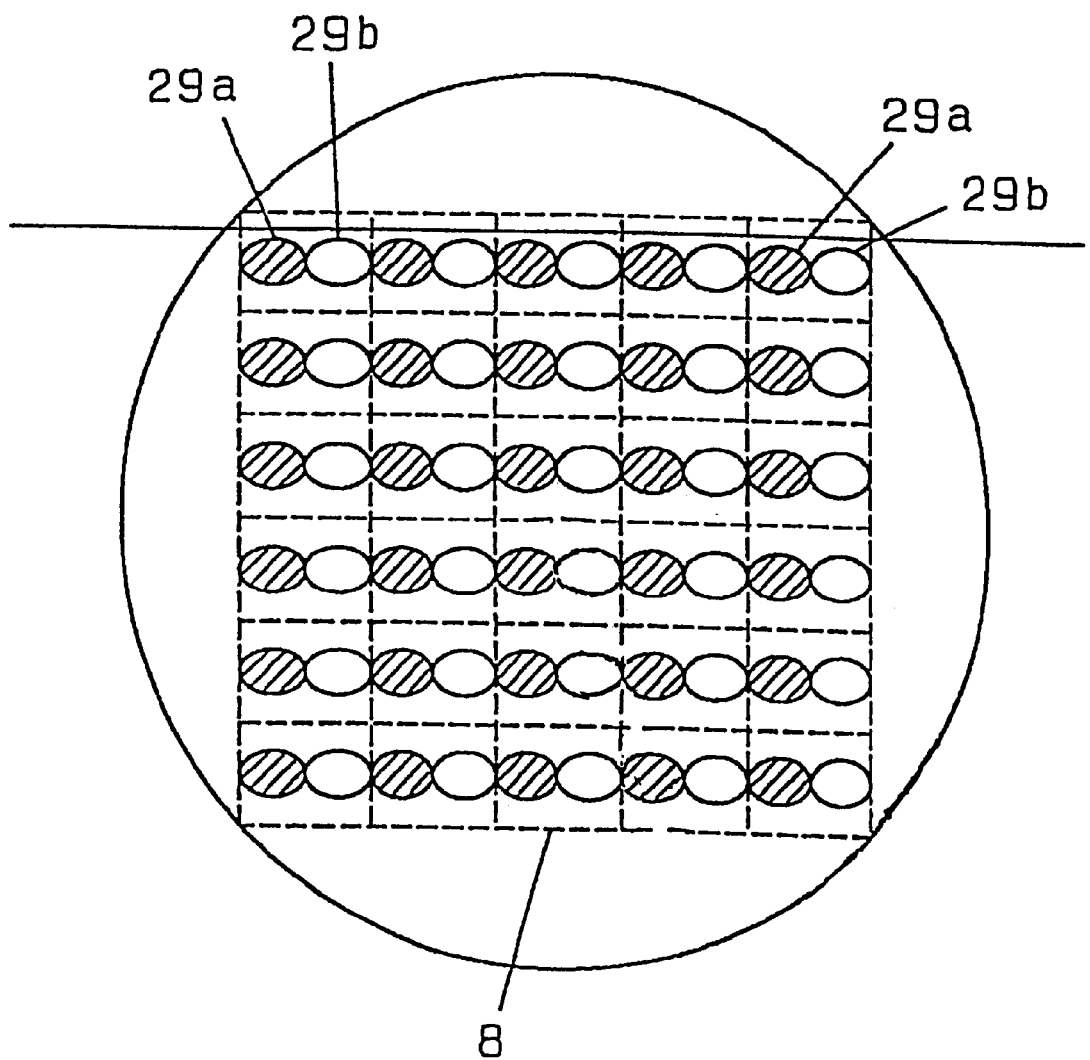
FIG. 8 is a plan of a light emitting device image of a lens array.

FIG. 1 is a plan of a liquid crystal projection apparatus in an embodiment of the invention, FIG. 2 is a partially magnified view of FIG. 1, FIG. 3 is a sectional view of a lamp as seen from the cut-off line S—S direction in FIG. 2, and FIG. 4 shows a two-lamp optical system. As shown in FIG. 1 and FIG. 4, the two-lamp optical system of the embodiment has lamp 1 and lamp 2. Each lamp has a light emitting tube 40 fixed near the focus of a cup-shaped elliptical reflecting mirror 41, and a front glass 42 for covering the front side of the elliptical reflecting mirror 41. The light from the lamp is deflected by a combining prism 35, and is transformed into a nearly parallel light by a collimator lens 5, and enters each cell of a first lens array 7, and is divided into multiple small luminous fluxes, and converged on each corresponding cell of a second lens array 8. The first lens array 7 and second lens array 8 may be in a same shape. In the second lens array 8, light emitting device images 29a, 29b of the lamps 1, 2 are formed at right and left side of each cell as shown in FIG. 8. Thereafter, it further comprises mirrors 28 of color separating system, field lens 32, combining prism 30, and projection lens 31, and they are nearly same as those in the conventional liquid crystal projection apparatus. These parts of the optical system are accommodated in the main body of the liquid crystal projection apparatus. As shown in FIG. 1 to FIG. 3, the lamps are put on a lamp house 52. The lamp house 52 is placed between a lamp cover upper plate 10 and a lamp cover lower plate 11. The lamp cover upper plate 10 has air vents 10A and 10B. Furnished cooling means 12 and 13 of the lamps 1 and 2 are disposed on the lamp cover upper plate 10. That is, the cooling means 12 and 13 are disposed parallel in the upper part of the lamp. The cooling means 12, 13 have air suction ports and air discharge ports. Usually, a centrifugal fan called sirocco fan is used for this purpose. The air suction port of the cooling means 12 faces the air vent 10A of the lamp cover upper plate 10. The main body of the liquid crystal projection apparatus accommodating the parts, lamps and cooling means of the optical system is accommodated in a case 14. The case 14 has a louver 15 for ventilation near the air discharge ports 12B, 13B of the cooling means. As shown in FIG. 2, an opening 15A of the louver 15 is opened obliquely to the front direction, and the direction of air stream from the air discharge port 12B of the cooling means coincides with the opening direction of the louver 15. Moreover, an air guide 16 communicates between the air discharge port 12B of the cooling means and the louver 15. FIG. 3 shows the lamp used in the invention. The lamp includes a cup-shaped reflecting mirror 41, an insulator 50 fitted to the bottom of the cup-shaped reflecting mirror 41, a front glass 42 fitted to the opening end of the cup-shaped reflecting mirror 41, and a light emitting tube 40 held by the insulator 50 and placed inside of the cup-shaped reflecting mirror 41. The insulator 50 has an air suction hole 50A for the lamp. The cup-shaped reflecting mirror 41 has an air discharge hole 41A for the lamp at its opening end. The air stream flowing in the lamp from the air suction hole 50A of the lamp into the air discharge hole 41A of the lamp flows along the light emitting tube 40, and cools the light emitting tube 40. The lamp 2 is placed almost air-tightly in the lamp house 52. The lamp house 52 is placed almost air-tightly between the lamp cover upper plate 10 and lamp cover lower plate 11. Air vents 10A, 10B are opened in the lamp cover upper plate 10. Air vents 53A, 53B are opened in the lamp house 52. Thus, the air suction port of the cooling means 12 faces the air vent 10A of the lamp cover upper plate 10. When the cooling means 12 operates, the cooling means 12 sucks the air from the air suction port, and an air stream a-b-c-d-e is formed as shown in FIG. 3. The air stream deprives the light emitting tube 40 in the lamp of heat, and passes through the louver, and flows out of the liquid crystal projection apparatus. Since the louver is provided near the air discharge port of the cooling means, the heat removed from the light emitting tube 40 does not heat the inside of the liquid crystal projection apparatus.

EFFECTS OF THE INVENTION

The liquid crystal projection apparatus of the invention cools a plurality of lamps in a same state by cooling the plurality of lamps individually. The cooling means of the invention sucks in hot air in the lamp, and exhausts this hot air outside of the apparatus through the louver of the case. Since the louver is disposed near the air discharge port of the cooling means, the hot air from the lamp does not heat the inside of the liquid crystal projection apparatus. Thus, the liquid crystal projection apparatus can be cooled effectively. Moreover, since the lamp is almost completely enclosed with the cup-shaped reflecting mirror and front glass, temperature control of lamp parts is easy. The louver is opened obliquely to the front direction, in which the image projecting direction is defined to be the front direction. Therefore, the user of the liquid crystal projection apparatus is usually situated beside or behind the apparatus, and is hence free from effects of hot air, noise or leak light from the apparatus.

What is claimed is:

1. A lamp comprising:

a cup-shaped reflecting mirror, the cup-shaped reflecting mirror having an air discharge hole;

an insulator fitted to the bottom of the cup-shaped reflecting mirror, the insulator having an air suction hole;

a front glass fitted to the opening end of the cup-shaped reflecting mirror;

a light emitting tube held by the insulator and disposed inside of the cup-shaped reflecting mirror; and an air passage from the air suction hole to the air discharge hole for cooling the light emitting tube.

2. A liquid crystal projection apparatus for projecting an image of a liquid crystal panel, comprising:

a plurality of lamps as a light source, each lamp of said plurality of lamps having furnished a cooling device for cooling the lamp;

an optical system including a liquid crystal panel and a projection lens for projecting the image of the liquid crystal panel and the projected image formed of the light from the lamps; and a case of the liquid crystal projection apparatus;

wherein each lamp includes a cup-shaped reflecting mirror having an air discharge hole, an insulator fitted to a bottom of said cup-shaped reflecting mirror and having an air suction hole, a front glass fitted to an opening end of said cup-shaped reflecting mirror, a light emitting tube held by said insulator and disposed inside of said cup-shaped reflecting mirror, and an air passage from said air suction hole to said air discharge hole for cooling said light emitting tube.

3. The liquid crystal projection apparatus of claim 2, wherein each cooling device has an air discharge port and a suction port.

4. The liquid crystal projection apparatus of claim 3, wherein each of said cooling devices comprises a centrifugal fan having an air discharge port and a suction port.

5. The liquid crystal projection apparatus of claim 2, wherein said cooling devices are disposed in upper parts of said lamps, respectively.

6. The liquid crystal projection apparatus of claim 2, wherein said cooling devices are disposed in lower parts of said lamps, respectively.

7. The liquid crystal projection apparatus of claim 2, wherein said case has a louver for ventilation, and each of said cooling devices sucks in air from the air discharge hole of a respective one of said lamps, and exhausts the air toward said louver.

8. The liquid crystal projection apparatus of claim 7, wherein said louver of said case opens obliquely to a forward direction, and a direction of exhaust from said air discharge port of each of said cooling devices coincides with an opening direction of said louver.

* * * * *